UNITED STATES PATENT OFFICE 3,786,093
Patented Jan. 15, 1974

3,786,093
NOVEL BISAMIDES CONTAINING FLUORINE
Bernard M. Lichstein, Elizabeth, and Robert J. Du Bois, Morristown, N.J., assignors to Allied Chemical Corporation, New York, N.Y.
No Drawing. Filed Oct. 17, 1969, Ser. No. 867,372
Int. Cl. C07c *103/30*
U.S. Cl. 260—561 HL       7 Claims

ABSTRACT OF THE DISCLOSURE

Novel compounds useful in imparting oil repellency to fabrics have the formula $(R_fCONH)_2CHR$ wherein $R_f$ is a radical containing at least one fluorine atom and from 1 to 20 carbon atoms, the radical being selected from the group consisting of alkyl, phenyl, alkylphenyl, phenylalkyl, and any of these radicals containing an ether linkage, and R is hydrogen, trichloromethyl, or phenyl. The compounds are prepared by reacting a nitrile of the formula $R_fCN$ with formaldehyde, chloral, chloral hydrate or benzaldehyde in the presence of a catalytic amount of a strong acid and preferably also in the presence of a solvent such as carbon tetrachloride.

BACKGROUND OF THE INVENTION

This invention relates to novel bisamides containing fluorine.

It is desirable to impart soil and stain repellency to fabrics used in apparel, upholstery, draperies and similar applications. A current method used to impart soil and stain repellency to fabrics involves coating the fabric with an oil repellent compound. The coating is normally applied using common textile finishing techniques, such as by treating the fabric with a padding bath of a solution or aqueous dispersion of the compound or by spraying the surface of the fabric with the compound.

In order to be suitable in such coating applications, a compound must possess certain critical properties in addition to oil repellency; for example, the compound must be capable of forming a uniform and even coating of proper thickness on the fabric and the coating must adhere well to the fabric and must not be easily removed by physical or chemical means. Other critical properties which the compound must possess are appreciated by those skilled in the art, but the suitability of a particular class of compounds in such applications can only be determined by empirical methods.

It is an object of this invention to provide a class of novel compounds useful for imparting oil repellency to fabrics and other textile materials.

SUMMARY OF THE INVENTION

This invention provides compounds capable of imparting oil repellency to fabrics, said compounds having the formula $(R_fCONH)_2CHR$ wherein $R_f$ is a radical containing at least one fluorine atom and from 1 to 20 carbon atoms, the radical being selected from the group consisting of alkyl, phenyl, alkylphenyl, phenylalkyl, and any of these radicals containing an ether linkage, and R is hydrogen, trichloromethyl or phenyl. The $R_f$ radical can be perfluorinated or can contain any lesser number of fluorine atoms down to at least one. As used herein, the term "alkyl radicals" includes both straight and branched chain radicals.

The compounds of this invention are prepared by reacting a nitrile of the formula $R_fCN$, wherein $R_f$ has the meaning given above, with a reactant selected from the group consisting of formaldehyde, chloral, chloral hydrate, and benzaldehyde, in the presence of a catalytic amount of a strong acid. The following aldehydes do not produce a detectable amount of the desired bisamide: m-nitrobenzaldehyde, p-chlorobenzaldehyde, p-hydroxybenzaldehyde, p-methoxybenzaldehyde, p-formylbenzoic acid, and the trimer of dichloroacetaldehyde.

The formaldehyde can be present in its monomeric form or in the form of a cyclic polymer, such as trioxane, or in the form of a linear polymer, such as paraformaldehyde. Trioxane is the preferred form of formaldehyde.

Suitable catalysts include sulfuric acid, hydrochloric acid, phosphoric acid, zinc chloride, ferric chloride, stannic chloride, and strongly acidic resins, such as Amberlyst 15, which is a cross-linked resin containing pendent—$SO_3^-H^+$ groups. The catalyst is preferably present in an amount of about 1% by weight based on the total weight of the reactants. Greater or lesser amounts of catalyst can be used if desired, but it is preferable not to use more than the minimum amount required to maintain a moderate rate of reaction. An excess of catalyst contributes to undesirable hydrolysis of the nitrile.

The reaction is preferably carried out in the presence of an inert solvent, such as chloroform or carbon tetrachloride.

The temperature of the reaction is not especially critical and can range from 0° C. up to the reflux temperature of the solvent.

When formaldehyde is used as the reactant, there is also obtained as a by-product of the reaction a hexahydro-s-triazine having the formula

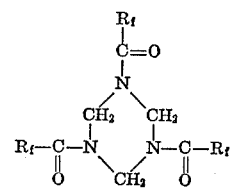

wherein $R_f$ is the same as in the bisamide product. These hexahydro-s-triazines are also novel compounds and are claimed in copending application Ser. No. 867,370, now U.S. Pat. No. 3,657,235, filed concurrently herewith.

The best mode contemplated for preparing the compounds of this invention is to react the appropriate nitrile with trioxane, choral hydrate or benzaldehyde in the presence of about 1% by weight of concentrated sulfuric acid as catalyst, and also in the presence of carbon tetrachloride as solvent, the reaction being carried out under reflux for a period of from one to two hours.

The compounds of this invention can be applied to fabrics to render them oil repellent by dissolving the compound in a suitable solvent, such as acetone, and then treating the fabric with the compound in solution, followed by removal of the solvent by evaporation. In some instances it is desirable to heat the treated fabric at moderately elevated temperatures, such as from about 120 to 160° C., for a brief period, such as about 5 minutes, in order to set the coating of the compound on the fabric. Fabrics thus treated exhibit greater oil repellency than untreated fabric. In comparison, fabrics treated with the nonfluorine-containing analogs of the compounds of this invention exhibit no improvement in oil repellency over untreated fabric.

DESCRIPTION OF THE PREFERRED EMBODIMENTS

The preferred compounds of this invention have the formula $(R_fCONH)_2CHR$ wherein $R_f$ has the formula $$Y(CF_2)_m(CH_2)_n-$$

wherein $m$ is an integer from 2 to 10, $n$ is an integer not greater than $m$ from 0 to 4, and Y is selected from the group consisting of $F_3C-$ and radicals having the formula

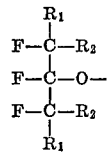

wherein $R_1$ and $R_2$ are independently fluorine or perfluoroalkyl groups having from one to two carbon atoms, the total number of carbon atoms being not more than 20. In especially preferred embodiments of this invention, $R_1$ and $R_2$ are fluorine, $m$ is 2 to 5, and $n$ is 0 to 2.

Nitrile reactants having the formula $$CF_3(CF_2)_m(CH_2)_nCN$$

are known compounds and can be made from commercially available materials in accordance with known methods. Nitrile reactants having the formula

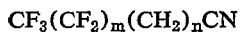

can be prepared from telomer halides having the formula

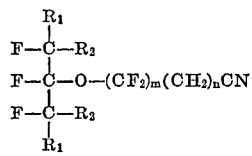

wherein $R_1$ and $R_2$ have the afore-stated meanings, $w$ and $x$ are integers representing the respective degrees of telomerization, and E is bromine or iodine. These telomer halides and their method of preparation are described in U.S. Pat. 3,514,487. The telomer halides are prepared by reacting telogens of the formula

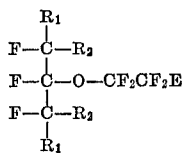

with telomerizable unsaturated compounds, i.e., tetrafluoroethylene and ethylene, the reaction being initiated by heat of free radical catalyst. The telogens are prepared by reacting the corresponding perfluorinated ketone with an ionizable fluoride salt, e.g. CsF, to form the corresponding organic salt, and then reacting the organic salt with tetrafluoroethylene and either bromine or iodine. Preparation of the telogens is described in greater detail in U.S. Pat. 3,453,333.

Nitrile reactants wherein $n$ is zero can be prepared by reacting the corresponding telomer halide with ICN or $(CN)_2$ at pressures above 20 atmospheres and at temperatures above 300° C. Nitrile reactants wherein $n$ is greater than zero can be prepared by reacting the corresponding telomer halide with an alkali metal cyanide in the presence of dimethyl sulfoxide at temperatures between 60 and 100° C. The nitriles and their method of preparation are described in greater detail in Canadian Pats. 823,673 and 823,674, corresponding to U.S. applications Ser. Nos. 721,115 and 721,117, respectively, both U.S. applications having been filed on Apr. 12, 1968.

The nitriles normally contain an even number of hydrocarbyl and fluorocarbyl groups following the perfluoroalkoxy group. However, nitriles containing an odd number of either group or both groups can be prepared by reacting the telomer halide with sulfur trioxide, followed by hydrolysis of the reaction product to obtain the acid, from which the nitrile can be prepared in accordance with known methods. Also, the acid thus formed can be converted to the corresponding telomer iodide for further telomerization by reaction with alkali-free silver oxide to form the silver salt, followed by reaction of the silver salt with powdered iodine to form the telomer iodide.

In adidtion to giving preferred results when applied to fabrics as conventional oil repellent agents, the preferred compounds of this invention have the additional utility of being capable of imparting oil repellency directly to fibers extruded from a composition of a fiber-forming synthetic resin and about 1% by weight of the compound. This particular use of the more preferred compounds of this invention is the invention of two of our co-workers and is disclosed in copending U.S. application S.N. 867,368, now U.S. Pat. No. 3,646,153, filed concurrently herewith.

The following examples further illustrate the invention. In each of the examples the product was identified by elemental, infrared spectrum, and nuclear magnetic resonance analyses.

EXAMPLE 1

A mixture of 15 grams of 5-perfluoroisopropoxy-5,5,4,4-tetrafluorovaleronitrile, 25 ml. of $CCl_4$, and 0.2 gram of concentrated $H_2SO_4$ were brought to reflux. A solution of 1.34 grams of trioxane in 45 ml. of $CCl_4$ was added over a period of one hour. The mixture was maintained at reflux for an additional 75 minutes. On cooling, the mixture separated into two layers. Each layer was dissolved in ether, washed with dilute NaOH and then water, dried over $MgSO_4$, and then stripped of solvent under vacuum. There was thus obtained from the bottom layer 3.2 grams of dried solid, 77% pure by gas chromatographic analysis, which was identified as bis(5-perfluoroisopropoxy-5,5,4,4-tetrafluorovaleroamido)methane.

EXAMPLE 2

The general procedure of Example 1 was followed except the reaction mixture contained 65.0 grams of 7-perfluoroisopropoxy - 7,7,6,6,5,5,4,4 - octafluoroheptanonitrile, 4.6 grams of trioxane, 0.7 gram of concentrated $H_2SO_4$, and 150 ml. of $CCl_4$. The by-product, 1,3,5-tris(7-perfluoroisopropoxy - 7,7,6,6,5,5,4,4-octafluoroheptanoyl) hexahydro-s-triazine, was removed from the reaction mixture by recrystallization from $CCl_4$. The mother liquor was then stripped of solvent and the resulting residue was recrystallized from petroleum ether to yield 7.0 grams of dried solid which was identified as bis(7-perfluoroisopropoxy - 7,7,6,6,5,5,4,4-octafluoroheptanamido) methane.

EXAMPLE 3

The general procedure of Example 2 was followed except the reaction mixture contained 5.1 grams of perfluorobenzonitrile, 0.8 gram of trioxane, 0.1 gram concentrated $H_2SO_4$, and 50 ml. of $CCl_4$. The product was a white solid, melting point 135° C., which was identified as bis(perfluorobenzamido)methane.

EXAMPLE 4

A mixture of 5.3 grams of benzaldehyde, 10.0 grams of 7 - perfluoroisopropoxy - 7,7,6,6,5,5,4,4 - octafluoroheptanonitrile and 10 ml. of concentrated $H_2SO_4$ was stirred at about room temperature for one hour. Water was added and the oil which separated was treated with methylene chloride, which produced solids which were washed with hot benzene. The benzene-insoluble material was recrystallized from $CH_3CN$ to give 0.7 gram of a white solid, melting point 113–114° C., which was identified as bis(7 - perfluoroisopropoxy - 7,7,6,6,5,5,4,4-octafluoroheptanamido)phenylmethane.

EXAMPLE 5

A mixture of 3.3 grams of chloral hydrate, 8.8 grams of 7 - perfluoroisopropoxy - 7,7,6,6,5,5,4,4 - octafluoroheptanonitrile, 10 ml. of concentrated $H_2SO_4$ and 50 ml. of chloroform was stirred at 25° C. for 17 hours. The mixture separated into two layers and the lower layer was treated with water which produced solids which were dissolved in ether, washed with water and dried using $Na_2SO_4$ and 3A molecular sieves. The solvent was removed by vacuum and the residue was recrystallized from chloroform to give a solid melting point 136–138° C., which was identified as 2-bis(7-perfluoroisopropoxy-7,7,6,6,5,5,4,4 - octafluoroheptanamido) - 1,1,1-trichloroethane.

We claim:

1. A compound of the formula $(R_fCOHN)_2CHR$ wherein R is hydrogen, trichloromethyl, or phenyl and $R_f$ has the formula

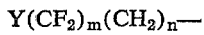

$$Y(CF_2)_m(CH_2)_n-$$

wherein m is an integer from 2 to 10, n is an integer not greater than m from 0 to 4, and Y is a radical having the formula

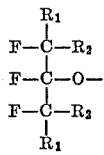

wherein $R_1$ and $R_2$ are independently fluorine or perfluoroalkyl groups having from one to two carbon atoms.

2. The compound of claim 1 wherein $R_f$ has the formula

$$(CF_3)_2CFO(CF_2)_m(CH_2)_n-$$

wherein m is 2 to 5 and n is 0 to 2.

3. The compound of claim 2 wherein R is trichloromethyl.
4. The compound of claim 2 wherein R is phenyl.
5. The compound of claim 2 wherein R is hydrogen.
6. The compound of claim 5 wherein m is an integer from 2 to 5, n is an integer not greater than m from 0 to 2, and $R_1$ and $R_2$ are fluorine.
7. The compound of claim 6 wherein m is 4 and n is 2.

References Cited

UNITED STATES PATENTS

| | | | |
|---|---|---|---|
| 2,337,313 | 12/1943 | D'Alelio | 260—561 |
| 2,534,204 | 12/1950 | Mowry | 260—404.5 |
| 2,742,501 | 4/1956 | Kleine et al. | 260—562 |
| 3,085,940 | 4/1963 | Tomcufcik et al. | 260—561 N |
| 3,475,434 | 10/1969 | Knell | 260—404.5 X |
| 3,420,697 | 1/1969 | Sweeney et al. | 260—404.5 X |
| 3,576,019 | 4/1971 | Sweeney et al. | 260—404.5 |

FOREIGN PATENTS

| | | | |
|---|---|---|---|
| 710,468 | 6/1954 | Great Britain | 260—561 R |

LEWIS GOTTS, Primary Examiner

E. G. LOVE, Assistant Examiner

U.S. Cl. X.R.

252—8.8; 260—248 NS, 404.5, 558 D, 558 P, 558 R, 559 R, 562 B